United States Patent
Shukla et al.

(10) Patent No.: US 9,679,297 B2
(45) Date of Patent: Jun. 13, 2017

(54) METHOD AND APPARATUS FOR ISOLATING ANALYTICS LOGIC FROM CONTENT CREATION IN A RICH INTERNET APPLICATION

(75) Inventors: Ajay Kumar Shukla, Bangalore (IN); Srikumar Sankaran, Bangalore (IN); Praveen Kumar, V, Tamil Nadu (IN); Sundaresan Krishnan Meenakshi, Chennai (IN); Stephen Hammond, Pleasant Grove, UT (US); Remus Mihai Stratulat, Bucharest (RO); Mayank Kumar, Bangalore (IN); Anirudh Sasikumar, Bangalore (IN); Ramesh Srinivasaraghavan, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 99 days.

(21) Appl. No.: 13/457,567

(22) Filed: Apr. 27, 2012

(65) Prior Publication Data
US 2013/0290854 A1    Oct. 31, 2013

(51) Int. Cl.
G06F 3/01       (2006.01)
G06F 15/173     (2006.01)
G06Q 30/02      (2012.01)
G06F 17/30      (2006.01)

(52) U.S. Cl.
CPC .......... *G06Q 30/02* (2013.01); *G06F 17/3089* (2013.01)

(58) Field of Classification Search
CPC .............. G06Q 30/02; G06Q 30/0277; G06Q 30/0242; G06Q 30/0276; G06F 17/3089; G06F 17/30873; G06F 3/048; G06F 17/30899; G06F 3/04842; G06F 3/0484; G06F 3/01; G06F 15/173
USPC .......... 715/736, 234, 760; 705/14.73, 14.41, 705/14.49
See application file for complete search history.

(56) References Cited

U.S. PATENT DOCUMENTS

| | | | |
|---|---|---|---|
| 2003/0065737 A1* | 4/2003 | Aasman ........................ 709/213 |
| 2005/0132296 A1* | 6/2005 | Milic-Frayling et al. .... 715/745 |
| 2005/0235030 A1* | 10/2005 | Lauckhart et al. ........... 709/200 |
| 2007/0027768 A1* | 2/2007 | Collins et al. .................. 705/14 |
| 2007/0250618 A1* | 10/2007 | Hammond .............. G06F 17/30 709/224 |
| 2008/0040216 A1* | 2/2008 | Dellovo .......................... 705/14 |
| 2008/0184138 A1* | 7/2008 | Krzanowski et al. ........ 715/760 |
| 2010/0095208 A1* | 4/2010 | White ............... G06F 17/30905 715/704 |
| 2010/0191827 A1* | 7/2010 | Martin .......................... 709/217 |
| 2010/0251128 A1* | 9/2010 | Cordasco ............ G06F 11/3409 715/736 |

(Continued)

*Primary Examiner* — Amy Ng
*Assistant Examiner* — Sang H Kim
(74) *Attorney, Agent, or Firm* — Keller Jolley Preece

(57) ABSTRACT

A method for isolating analytics logic from content creation is a rich Internet application. In an embodiment, a method for isolating analytics tracking logic comprises receiving a rich Internet application, identifying a plurality of event elements within the content separate from content creation, tagging the identified plurality of event elements, wherein the event elements are tagged in isolation of content creation, and storing the content including the tagged event elements. The set of tagged event elements may be modified in isolation of content creation.

20 Claims, 15 Drawing Sheets

(56) References Cited

U.S. PATENT DOCUMENTS

2011/0153796 A1* 6/2011 Branson ............ G06F 17/30887
  709/223
2012/0254720 A1* 10/2012 Hamm et al. ................. 715/234
2013/0073382 A1* 3/2013 Henkin et al. ............. 705/14.49
2013/0263023 A1* 10/2013 Goodwin et al. ............. 715/760
2014/0223005 A1* 8/2014 Everly .................... H04L 67/22
  709/224

* cited by examiner

Marketer Enabled Analytics

MARKETER ENABLED ANALYTICS

☑ Track SWF onload
☐ Video Tracking
☑ State Tracking

SWF Address Deep Links Found
☐ Select All
☑ Home (http:/....)  [Add...]
☐ Video (http:/....)  [Add...]
☑ Images (http:/....)
[Finish]

☐ Button Tracking

[Display Configuration]

1104

[Home] [Video] [Images]

Actual content from the URL

◉ Option 1 (selected)
○ Option 2
○ Option 3 (disabled)
◉ Option 4
    (disabled and selected)

A row without a radio button

[OK]

| Name (job title) | ▲ Age | One Nickname | Two | Three Employee |
|---|---|---|---|---|
| Giacomo Guilizzoni Founder and CEO | 34 | Peldi | ☑ | ☑ |
| Guido Jack Guilizzoni Tuttofare | 4 | | ☐ | |
| Marco Botton Tuttofare | 31 | The | ☑ | |
| Mariah Maciachain Better Half | 35 | Potata | ☑ | ☑ |

FIG. 11

METHOD AND APPARATUS FOR ISOLATING ANALYTICS LOGIC FROM CONTENT CREATION IN A RICH INTERNET APPLICATION

BACKGROUND OF THE INVENTION

Field of the Invention

Embodiments of the present invention generally relate to rich Internet applications and, more particularly, to a method and apparatus for isolating analytics logic from the content creation in a rich Internet application for efficient data collection.

Description of the Related Art

The rapid proliferation of multimedia content (i.e., user interactive controls and application generated controls that create an exciting and interesting multimedia experience) throughout the Internet was caused by numerous technological innovations. Accordingly, such multimedia content may be referred to as rich Internet content with which users spend a significant amount of time conducting various activities (e.g., surfing educational websites, viewing detailed product demonstrations, accessing digital libraries and participating in expert discussion forums related to the multimedia content). These users often download and view the rich Internet content on various display devices (e.g., a mobile phone, an electronic book reader, a Personal Digital Assistant (PDA), a hand-held gaming device and/or the like from various Internet resources (e.g., web pages, multimedia clips and/or content, emails and/or the like).

Rich Internet Applications (RIAs) provide interactive functionality for the rich Internet content. Consequently, RIAs have become a very popular multimedia tool on websites throughout the Internet. An RIA typically is a collection of rich Internet content that is wrapped within programming code to be executed by a playback routine. For example, some RIAs may comprise animations, interfaces, games, video clips, audio clips, and/or other interactive or passive content (referred to herein as "rich Internet content"). In addition, an RIA typically includes program code to instruct a playback routine (referred to as an "RIA Player") regarding how to display and progress through the content of the RIA. One such RIA Player is a FLASH® player (FLASH is a registered trademark of Adobe Systems Incorporated) that executes an RIA in the form of a SWF file to present rich Internet content to a viewer. A SWF file format is defined by the SWF File Format specification (version 10) as by Adobe Systems Incorporated of San Jose, Calif.

Web analytics allow marketers and brand managers to collect session-level information about user interaction in a rich Internet application. The analytics provide an understanding of the value of each piece of content. Reports based on user behavior provide marketers with the knowledge necessary to improve marketing campaigns and improve creative content. Marketers select specific user interactions within the RIA content that they wish to track, called event elements. As users navigate through the RIA, the interactions with the event elements are recorded and reported to the marketer. Currently, the analytics solutions for rich Internet applications require the logic for data collection to be coded inside the application during content creation. This approach requires marketers and brand managers to work closely with developers to have the tracking code embedded in the RIA when the content is created. When marketers or brand managers want to change the elements they wish to track in the RIA, they need to work with the developers again, which results in significant overhead related to project planning, approvals, development, testing, acceptance and deployment.

Therefore, there is a need in the art for analytics logic to be isolated from the main content creation and an intuitive interface designed for dynamically changing the tracking preferences.

SUMMARY OF THE INVENTION

Embodiments of the present invention comprise a method and apparatus for isolating analytics tracking logic from content creation for a rich Internet application. One embodiment comprises providing content for a rich Internet application and identifying a plurality of event elements of content separate from content creation. The identified plurality of event elements is then tagged. The event elements are tagged in isolation of content creation and the content including the tagged event elements is stored.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 11 illustrates a display screen containing a display for state tracking, according to one or more embodiments of the invention;

Figure 1:
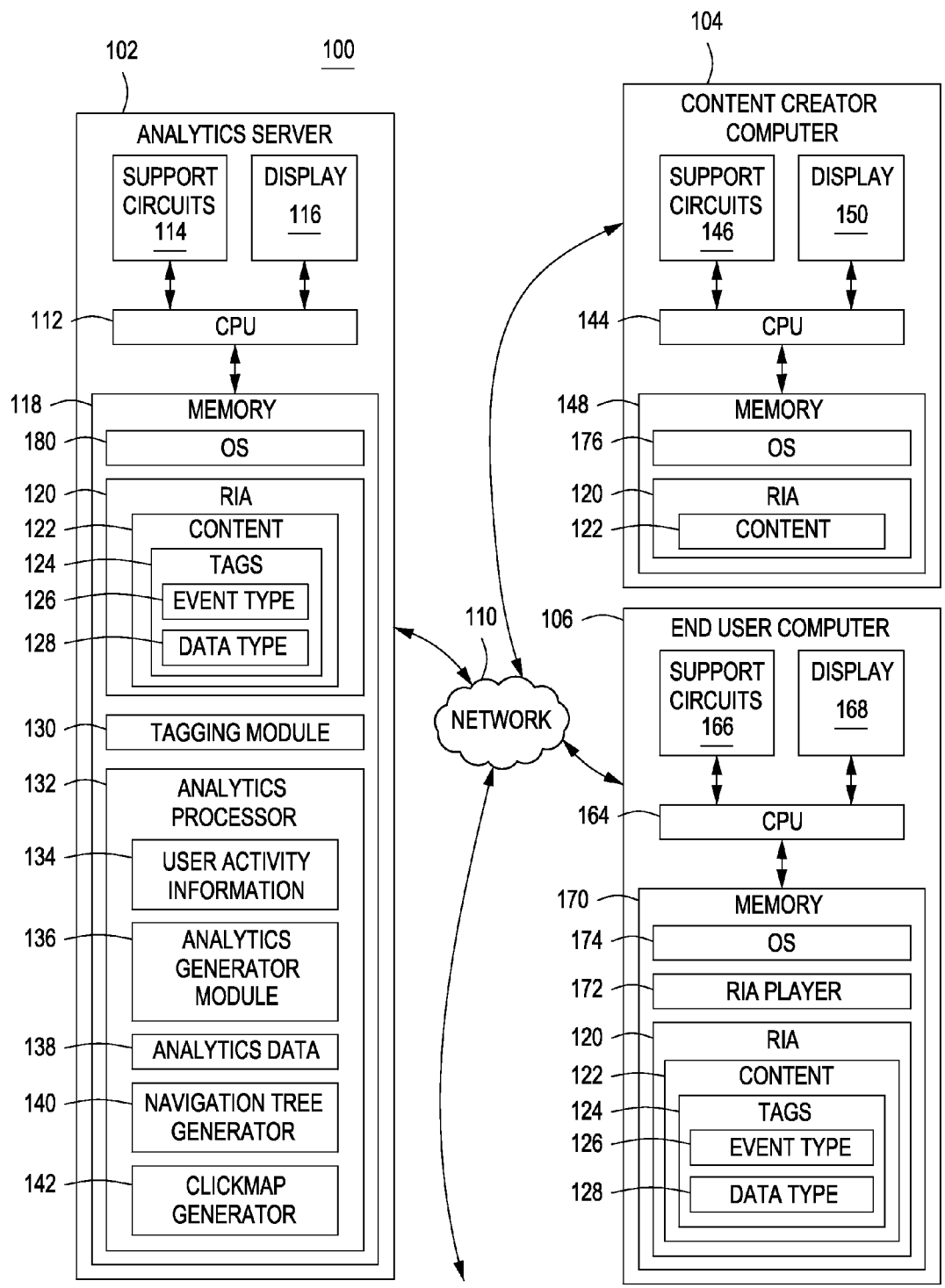
FIGS. 1 and 1A depict a block diagram of a computing system for isolating analytics logic from content creation in a rich Internet application, according to one or more embodiments of the invention.
Figure 1A:
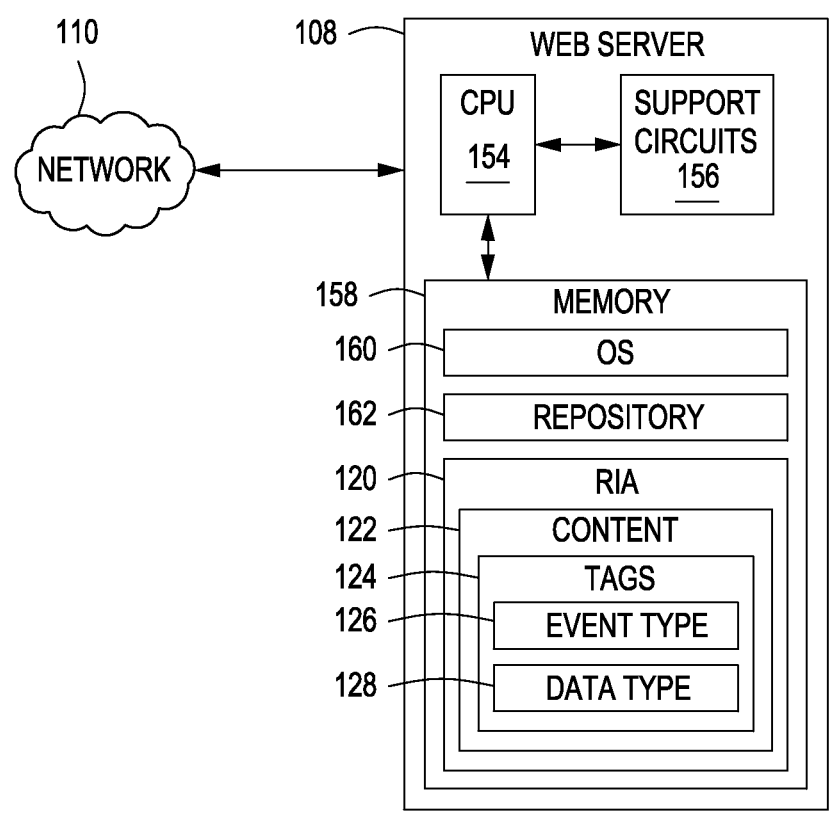

While the method for isolating analytics logic from content creation in a rich Internet application is described herein by way of example for several embodiments and illustrative drawings, those skilled in the art will recognize that the system and method for isolating analytics logic from content creation is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method for isolating analytics logic from content creation as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention provide a method and apparatus for isolating analytics logic from content creation in a rich Internet application (RIA). In one or more embodiments, specific content is selected for tracking. The selected content, hereafter event elements, are tagged for tracking. The event elements are saved with the RIA. When an end user navigates through the RIA, the user's activity information is gathered for the selected event elements and the information is sent to the analytics processor which generates analytics based on the user's activity. The tagging process may be repeated and different event elements selected at any time. The new set of event elements will be tracked the next time an end user navigates through the RIA. In one or more embodiments, all trackable content is initially tagged, but the tags are inactive. Tags are later activated on content that has been selected for tracking. The tagged content, hereafter "event elements" are saved with the RIA. As above, as the end user navigates through the RIA, the user's activity information is gathered for the selected event elements and the information sent to the analytics processor for analytics generation.

Various embodiments of a method for isolating analytics logic from content creation in a rich Internet application are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a computing system 100 for isolating analytics logic from content creation in a rich Internet application, according to at least one embodiment of the invention. The computing system 100 comprises an analytics server 102, a content creator computer 104, an end user computer 106, a web server 108 and a network 110. The network 110 communicably couples the analytics server 102, the content creator computer 104, the end user computer 106, and the web server 108. The content creator computer 104 provides a rich Internet application 120 comprising content 122. In one or more embodiments, the analytics server 102 facilitates the tracking of the content 122 of the rich Internet application 120. The analytics server 102 comprises a tagging module 130 which takes the rich Internet application 120, displays the content 122 on the display 116 with an overlay for a marketer, or other observer, to use to selectively tag or activate tags on the content 122 the marketer wishes to have tracked. The server 108 is configured to store the RIA 120 with the content 122 and tags 124. A tag defines what events are to be tracked for each element and the type of data to be tracked for each event. The data gives context to the event being tracked. As such, each tag comprises an event type 126 and a data type 128. For example, an event type may be "swf onload" with an associated data type of "load time". An event type of "logged in" would have a data type of "name". A button would have an event type of "click" and may have a data type of Boolean. The web server 108 also provides access to the RIA 120 through the network 110 to connected devices, such as the end user computer 106.

The content creator computer 104 is a type of computing device (e.g., a laptop, a desktop, a Personal Digital Assistant (PDA), a tablet, a mobile phone and/or the like) known to one of ordinary skill in the art. The content creator computer 104 comprises a Central Processing Unit (CPU) 144, support circuits 146, a display 150 and a memory 148. The CPU 144 may comprise one or more commercially available microprocessors or microcontrollers that facilitate data processing and storage. The various support circuits 146 facilitate the operation of the CPU 144 and include one or more clock circuits, power supplies, cache, input/output circuits, and the like. The display 150 comprises one or more known display screens such as LCD, LED, AMOLED that display digital information graphically, for example, the rich Internet application. The memory 148 comprises at least one of Read Only Memory (ROM), Random Access Memory (RAM), disk drive storage, optical storage, removable storage and/or the like. The memory 148 comprises an operating system (OS) 176, the rich Internet application 120, and the content 122 associated with the RIA.

The analytics server 102, is a type of computing device (e.g., a laptop, a desktop, a Personal digital Assistant (PDA), a tablet, a mobile phone and/or the like) known to one of ordinary skill in the art. The analytics server 102 comprises a Central Processing Unit (CPU) 112, support circuits 114, a display 116, and a memory 118. The memory comprises an operating system (OS) 180. The analytics server 102 is configured to receive a rich internet application 120 rendered on the content creator computer 104 having content 122. Content 122 are comprised of elements such as buttons, videos, images, and the like. The analytics server 102 comprises a tagging module 130 which displays the content 122. Content 122 that is able to be tracked is displayed in a list. Selections are made from the list as to what content is to be tracked. In one embodiment, selected elements are tagged. In another embodiment, all elements are tagged and when elements are selected, the tags of the selected elements are activated. The content and the event elements are saved in the memory 118.

The analytics server 102 further comprises an analytics processor 132. User activity information 134 is received from the end user computer 106 and is stored by the analytics processor 132. An analytics generation module 134 uses the user activity information 134 to generate analytics data 138. The analytics data may be viewed in report form, such as spreadsheets, data lists, pie charts, and the like. A navigation tree generator 140 uses the analytics data 138 to generate a navigation tree and display the tree to show traffic flow through the rich Internet application 120. A clickmap generator 142 uses the analytics data 138 to create a clickmap to overlay over the rich Internet application content 122. This provides visual feedback regarding which content is more frequently accessed.

The web server 108 is a type of computing device (e.g., a laptop, a desktop, a Personal Digital Assistant (PDA), a tablet, a mobile phone and/or the like) known to one of ordinary skill in the art. The server 108 comprises a Central Processing Unit (CPU) 154, support circuits 156, and a memory 158. The CPU 154 may comprise one or more commercially available microprocessors or microcontrollers that facilitate data processing and storage. The various support circuits 156 facilitate the operation of the CPU 154 and include one or more clock circuits, power supplies, cache, input/output circuits, and the like. The memory 158 comprises at least one of Read Only Memory (ROM), Random Access Memory (RAM), disk drive storage, optical storage, removable storage and/or the like. The memory 158 comprises an operating system (OS) 160, and a repository 162. In one or more embodiments, the rich Internet application 120 is stored on the web server 108. In some embodiments, the web server 108 and the analytics server 102 may be the same device.

The end user computer 106 is a type of computing device (e.g., a laptop, a desktop, a Personal Digital Assistant (PDA), a tablet, a mobile phone and/or the like) known to one of ordinary skill in the art. The end user computer 106 comprises a Central Processing Unit (CPU) 164, support circuits 166, a memory 170 and a display 168. The CPU 164 may comprise one or more commercially available microprocessors or microcontrollers that facilitate data processing and storage. The various support circuits 166 facilitate the operation of the CPU 164 and include one or more clock circuits, power supplies, cache, input/output circuits, and the like. The end user computer 106 comprises a memory 170 comprising an operating system (OS) 174 and an RIA player 172 for displaying the content 122 of the rich Internet application 120. As the user navigates through the RIA 120, the user's activity information is gathered. In one or more embodiments, the user's activity information is sent to the analytics server 102 after each event. In one or more embodiments, the user's activity information is sent to the analytics server 102 when the user navigates away from the RIA 120. For example, in Flash, a local connection/External Interface/Socket may be used for communication between the end user computer 106 and the analytics server 102. In AJAX, it can be an http channel with JavaScript functions for interaction with browser extensions. Essentially, a bidirectional communication channel is required for exchanging the display and command information.

The network 110 is any network generally known in the art, for example, the Internet, that allows for communicating the rich Internet application 120 from the content creator computer 104 to the analytics server display 116. The rich Internet application may be delivered to the analytics server 102 via alternate means, such as memory sticks, local wireless networks, among several other generally known modes of communicating data.

Figure 2:
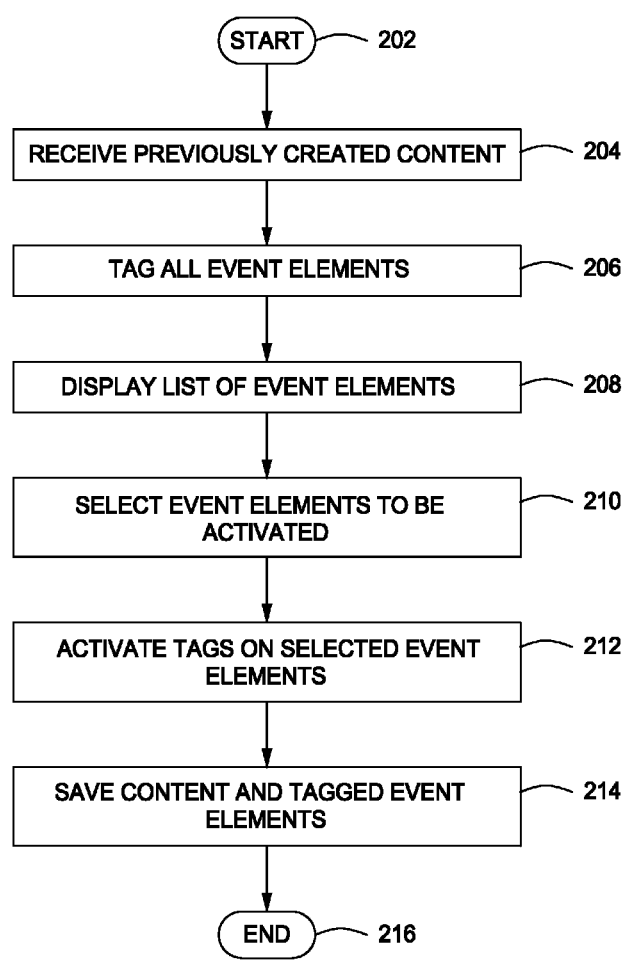
FIG. 2 depicts a flow diagram of a method for activating tags on event elements in a rich Internet application as performed by the tagging module of FIG. 1, according to one or more embodiments of the invention.

FIG. 2 depicts a flow diagram of the method 200 for activating tags on event elements as performed by the tagging module of FIG. 1, according to various embodiments. The method 200 starts at step 202 and proceeds to step 204. At step 204 the method 200 receives the previously created content of a rich Internet application. The method 200 proceeds to step 206. At step 206 all elements are tagged. Elements are content that is able to be tracked. The method 200 attaches a tag to each element. The tag is coded for example, using an XML file format. The tags capture the element, events, and other data in the content which is selected for tracking. The method 200 proceeds to step 208. At step 208 a list of all elements are displayed next to the content of the rich Internet application. The method 200 proceeds to step 210. At step 210, elements are selected for tracking. The method 200 proceeds to step 212. At step 212 the tags on the selected elements are activated. An element that has been selected for tracking is referred to as an event element. It is an element which has a specific event type to be tracked. In one embodiment, a button may be selected for tracking with an event type of "click". That button's tag is activated, and when an end user clicks on the button while navigating the RIA, that event will be reported to the analytics server. The method 200 proceeds to step 214. At step 214 the content and event elements are saved. The method 200 proceeds to step 216 and ends.

Figure 3:
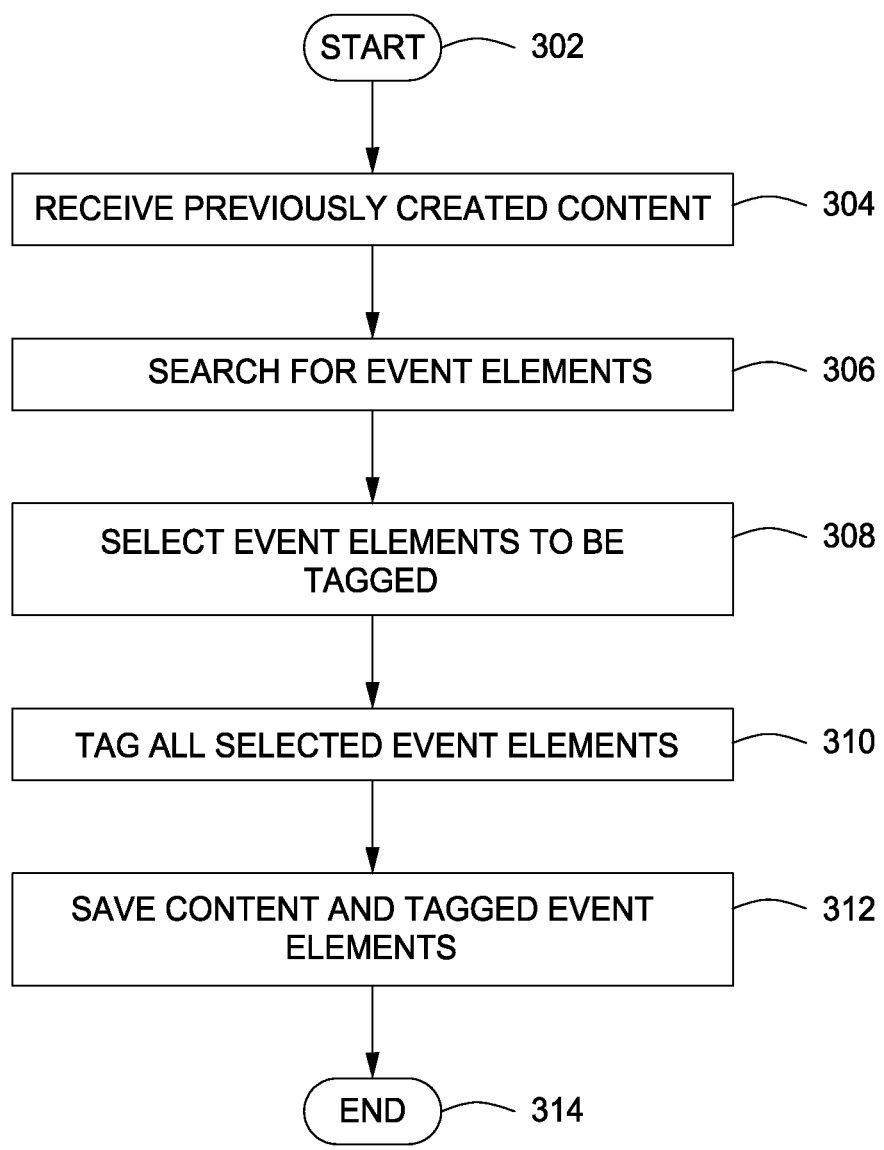
FIG. 3 depicts a flow diagram of a method for tagging event elements in a rich Internet application as performed by the tagging module of FIG. 1, according to one or more embodiments of the invention.

FIG. 3 depicts a flow diagram of a method 300 for tagging event elements as performed by the tagging module of FIG. 1, according to various embodiments. The method 300 starts at step 302 and proceeds to step 304. At step 304 the method 300 receives the previously created content of a rich Internet application. The method 300 proceeds to step 306. At step 306 all elements are searched for and displayed in a list next to the content of the RIA. As described above, elements are content that is able to be tracked. The method 300 proceeds to step 308. At step 308 the elements are selected for tracking. The method 300 proceeds to step 310. At step 310 the selected elements are tagged. In one or more embodiments, the tag is coded for example, using an XML file format. The tags capture the element, events, and other data in the content which is selected for tracking. The method 300 proceeds to step 312. At step 312 the content and event elements are saved. The method 300 proceeds to step 314 and ends.

Figure 4:
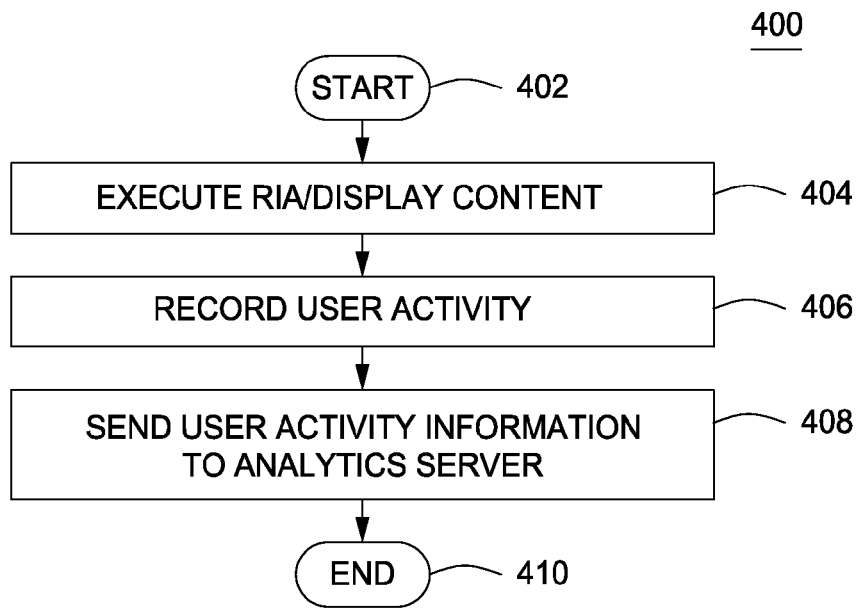
FIG. 4 depicts a flow diagram of a method for collecting user activity information in a rich Internet application as performed on the end user computer of FIG. 1, according to one or more embodiments of the invention.

FIG. 4 depicts a flow diagram of a method 400 for collecting user activity information on the end user computer 106 of FIG. 1, according to one or more embodiments. The method starts at step 402 and proceeds to step 404. At step 404 the method 400 executes an RIA player when the end user navigates to the RIA and the content of the RIA is displayed. The method 400 proceeds to step 406. At step 406 the user activity is recorded for all event elements. For example, if an event element is a "Search" button and the event to be tracked is "click", when the end user clicks the "Search" button, that event will be reported to the analytics server. However, if an end user "hovers" over the "Search" button, that event will not be reported, because that event has not been tagged for tracking on the "Search" button. The method 400 proceeds to step 408. At step 408 the user activity information is sent to the analytics server. In one embodiment, each event is reported to the analytics server as each event occurs. In another embodiment, the end user activity is collected and reported to the analytics server when the end user navigates away from the RIA. The method 400 proceeds to step 410 and ends.

Figure 5:
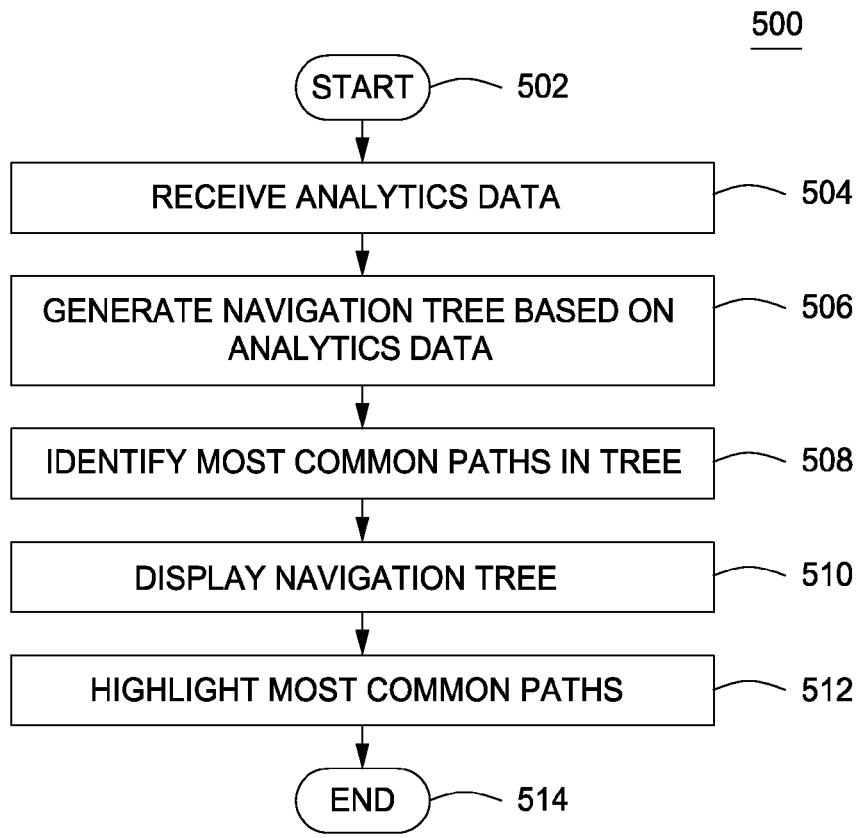
FIG. 5 depicts a flow diagram of a method for generating and displaying a navigation tree for a rich Internet application as performed by the analytics processor in FIG. 1, according to one or more embodiments of the invention.
Figure 13:
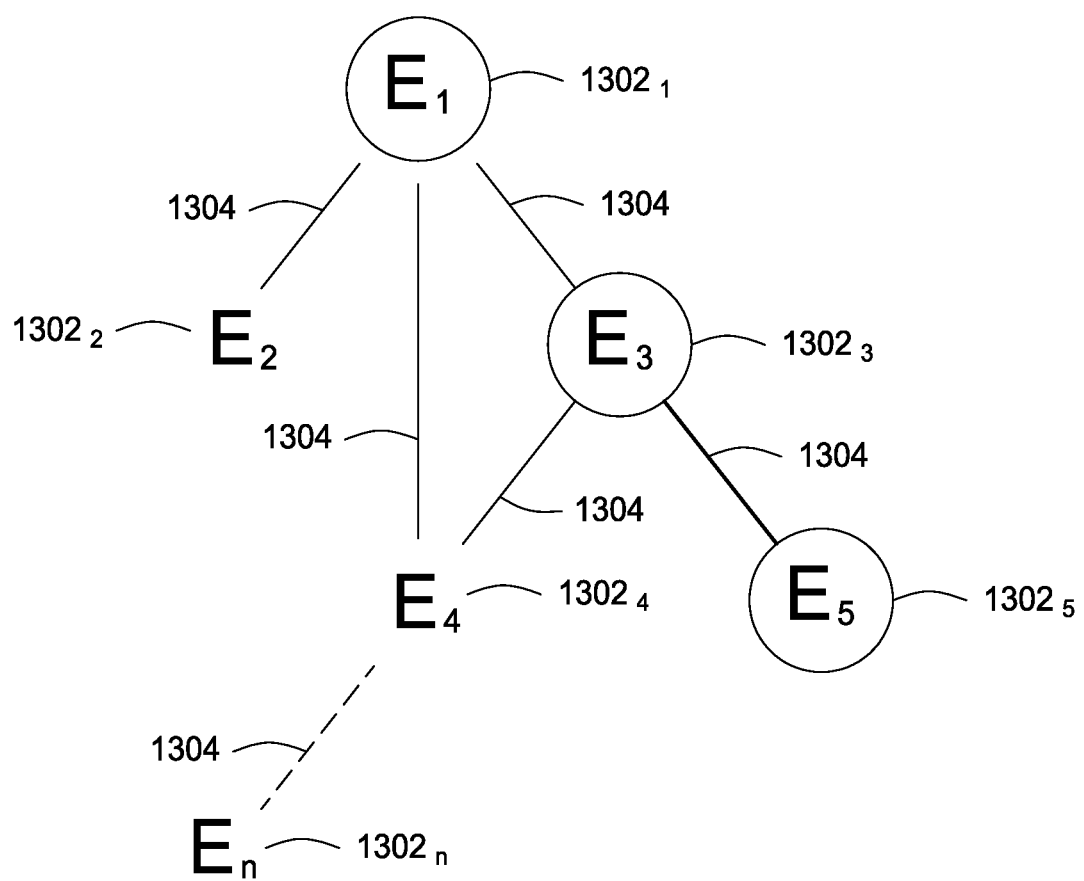
FIG. 13 depicts a diagram of a navigation tree, according to one or more embodiments of the invention.

FIG. 5 depicts a flow diagram of a method 500 for generating and displaying a navigation tree as performed by the navigation tree generator 140 in FIG. 1, according to one or more embodiments. The method 500 starts at step 502 and proceeds to step 504. At step 504 the analytics data is received from the analytics processor. The method 500 proceeds to step 506. At step 506 a navigation tree is generated based on the analytics data. In one embodiment, all user interactions are recorded and sent to the analytics server and a navigation tree is constructed for a single end user session. The navigation tree is a visual preview of the path taken by a user in the RIA. In another embodiment, only selected paths in the user interactions will be recorded and the navigation tree is created based on the aggregation of all user interactions for the selected paths. The navigation tree is a display of the most commonly used path by users. Each web page of the RIA is represented as a node in the navigation tree. The method 500 proceeds to step 508. At step 508 the most commonly traveled paths in the navigation are identified. The method 500 proceeds to step 510. At step 510 the navigation tree is displayed as depicted in FIG. 13. The method 500 proceeds to step 512. At step 512 the most commonly traveled paths are identified using highlighting, boldface, and/or the like. More frequently traversed paths from one web page of the RIA to another are display bolder than the paths between lesser traversed pages. The most frequently visited nodes are circled. The method 500 proceeds to step 514 and ends.

Figure 6:
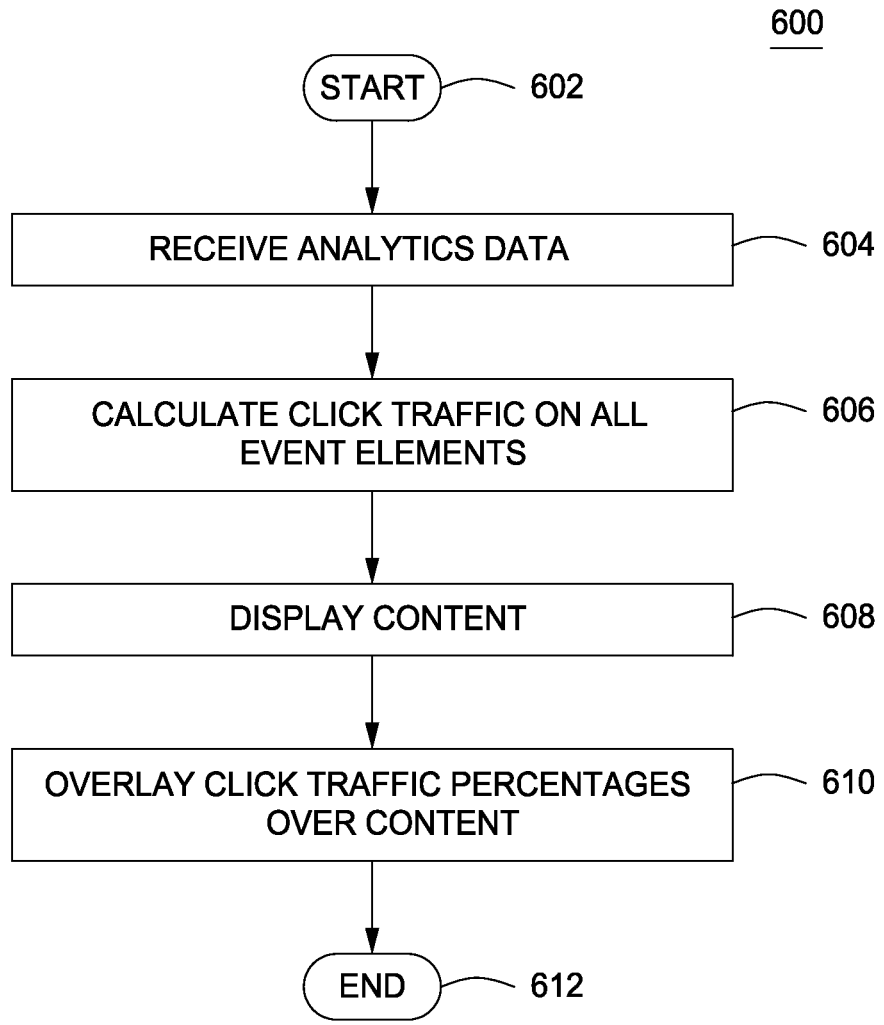
FIG. 6 depicts a flow diagram of a method for generating a click map for a rich Internet application as performed by the clickmap generator of FIG. 1, according to one or more embodiments of the invention.
Figure 14:
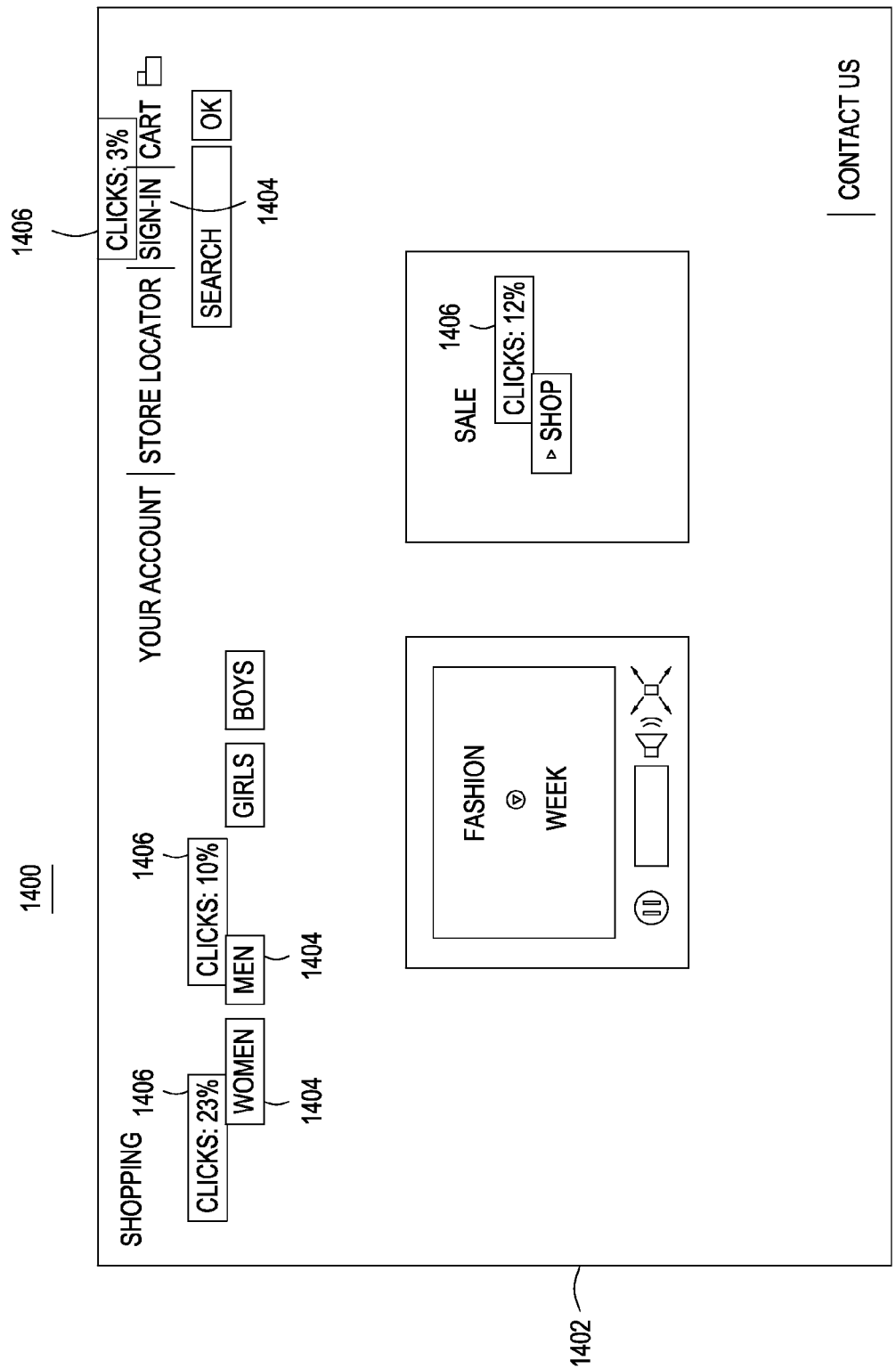
FIG. 14 illustrates a display screen containing a display of a clickmap, according to one or more embodiments of the invention.

FIG. 6 depicts a flow diagram of a method 600 for generating a clickmap as performed by the clickmap generator 142 in FIG. 1, according to one or more embodiments. The method 600 starts at step 602 and proceeds to step 604. At step 604 the analytics data is received from the analytics processor. The method 600 proceeds to step 606 where the click traffic is calculated on all event elements. The clickmap generator uses the analytics data generated from the end user activity to aggregate all user click activity for all buttons and/or links in the content of the RIA selected for tracking. The clickmap generator calculates what percentage of total clicks is associated with each selected button and/or link. The method 600 proceeds to step 608. At step 608 the content is displayed. The method 600 proceeds to step 610. At step 610 the click traffic percentages are overlaid on the content as depicted in FIG. 14. The method 600 proceeds to step 612 and ends.

Figure 7:
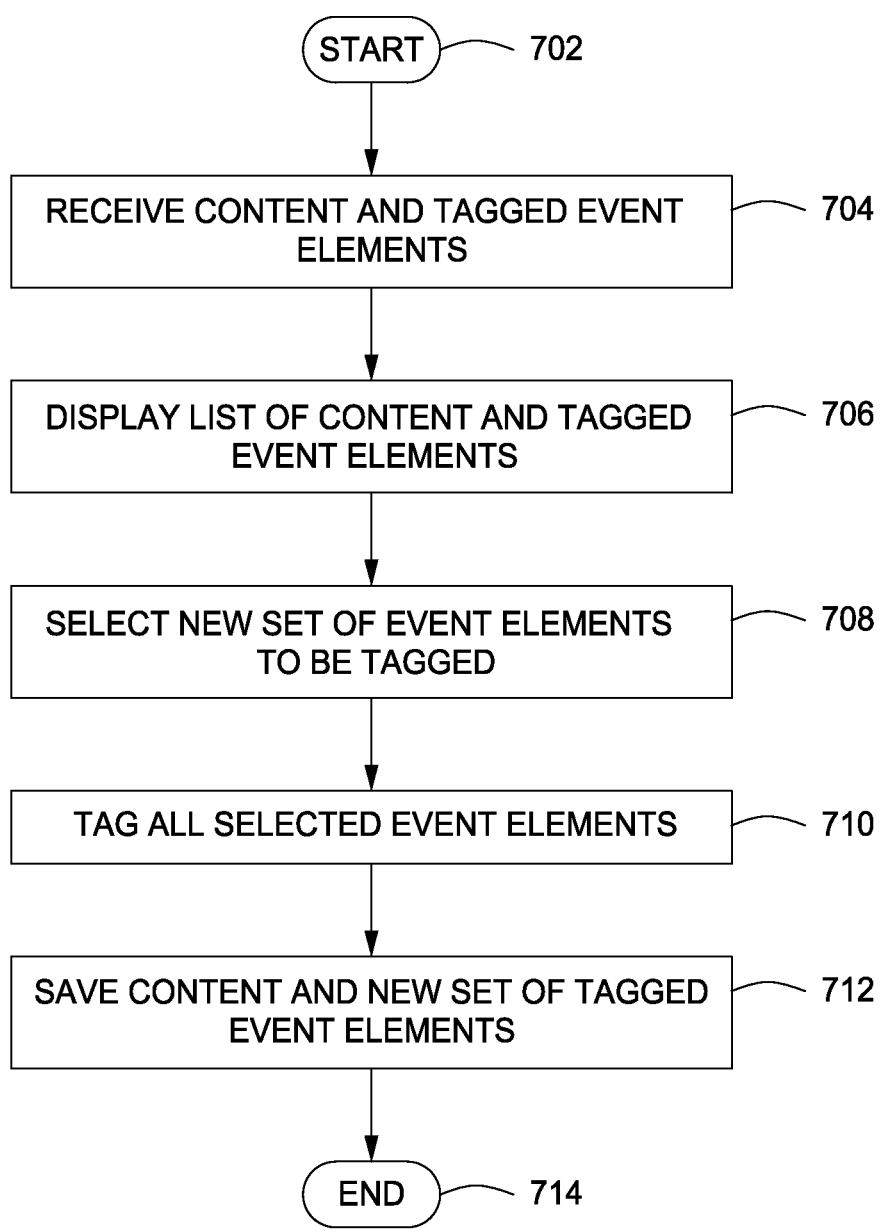
FIG. 7 depicts a flow diagram of a method for updating event element tracking information in a rich Internet application as performed by the tagging module of FIG. 1, according to one or more embodiments of the invention.

FIG. 7 depicts a flow diagram of a method 700 for updating event element tracking information in a rich Internet application as performed by the tagging module 130 in FIG. 1, according to one or more embodiments. The method 700 starts at step 702 and proceeds to step 704. At step 704 the content and event elements are retrieved from the memory of the analytics server. The method 700 proceeds to step 706. At step 706 the content is displayed. Trackable content, called elements are displayed in a list next to the content, and currently tagged elements, called event elements are identified. The method 700 proceeds to step 708. At step 708 a different set of elements is selected. The method 700 proceeds to step 710. At step 710 all selected elements are tagged, in one or more embodiments. As described above, a tag defines what events are to be tracked for the element and the type of data to be tracked for each event. Event elements which are no longer selected for tracking have their tags removed. In another embodiment, selected event elements have their tags activated and those event elements no longer selected for tracking have their tags deactivated. The method 700 proceeds to step 712. At step 712 all content and the new, different set of event elements is saved. The method 700 proceeds to step 714 and ends.

Figure 8:
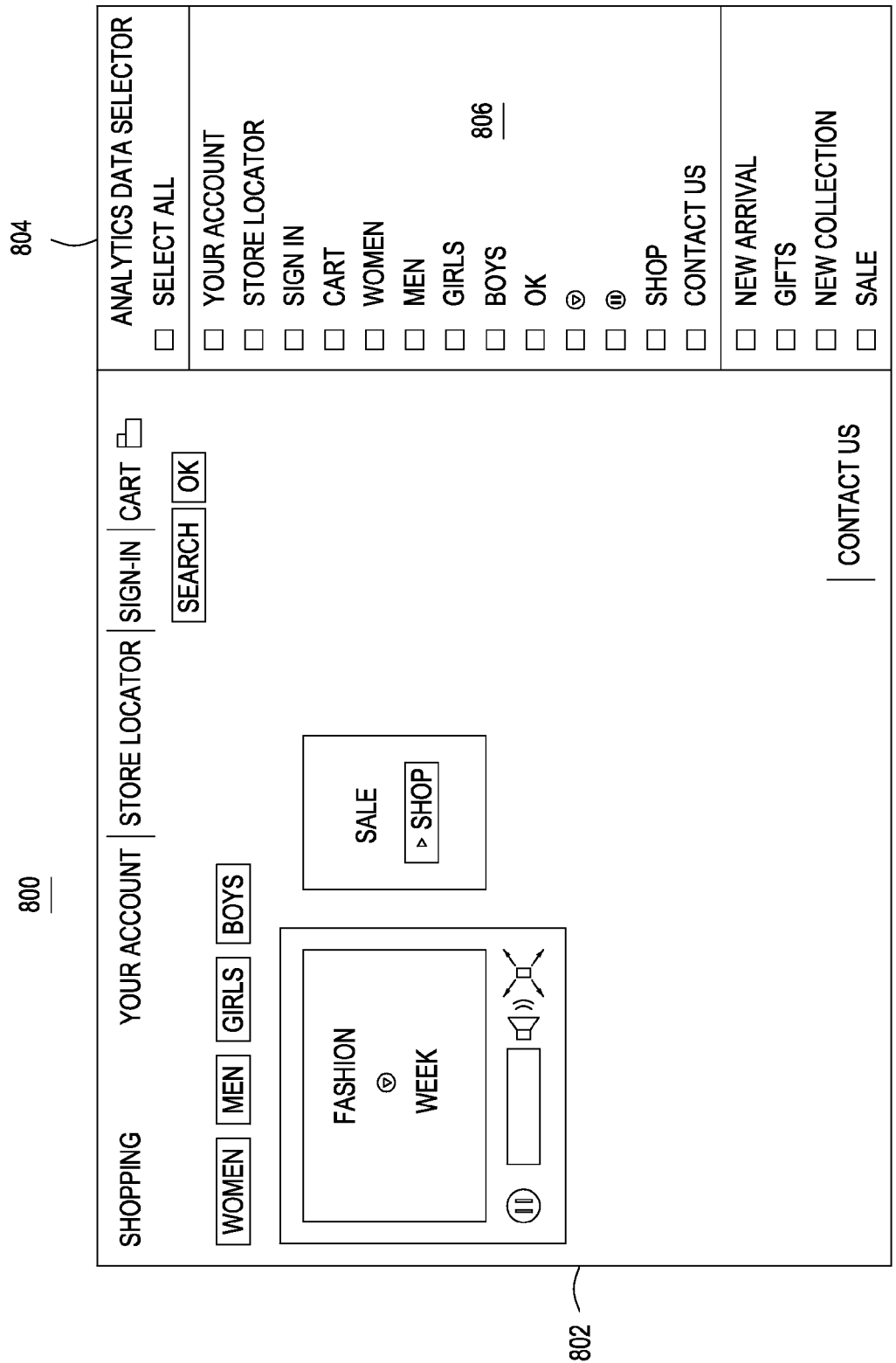
FIG. 8 illustrates a display screen containing a display of event element selection, according to one or more embodiments of the invention.

FIG. 8 illustrates a display screen of a user interface 800, according to one or more embodiments. The user interface 800 is designed to provide an element selection area as well as direct feedback regarding elements tagged for tracking. The user interface 800 for element tagging comprises the rich Internet application content 802 and a selection pane 804. The selection pane 804 contains a list 806 of all content that is available to be tracked. The list is organized with elements which are currently displayed on the user interface 800 at the top and other selectable elements that are not in the current display, but are available on other web pages or locations within the rich Internet application at the bottom. When an element in the list 806 is selected, the corresponding content will be identified on the screen using highlighting, bold text, and/or the like. When all selections are complete, the content and the selected elements are tagged and saved. In another embodiment, the tags on the selected elements are activated and the tags on any elements that have not been selected are deactivated. The content and selected elements are then saved. The event elements are selected in an intuitive manner without ever going back to the content creator.

Figure 9:
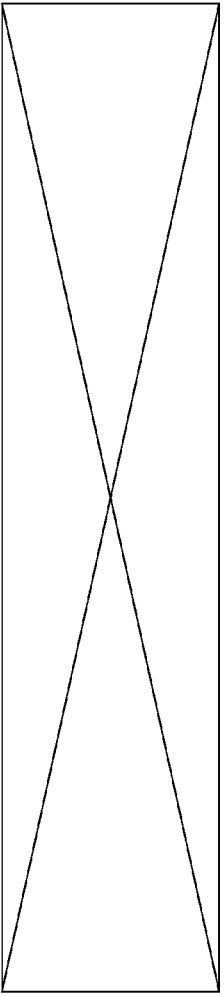
FIG. 9 illustrates a display screen containing a display of event tracking for various tracking options, according to one or more embodiments of the invention.

FIG. 9 illustrates a display screen of a user interface 900, according to one or more embodiments. The user interface 900 is designed to provide a tracking selection area to enable tracking of various content. The user interface 900 for tracking analytics comprises the rich Internet application content and a selection pane 902. The selection pane 902 contains a list of analytics which can be tracked and identifies which analytics are enabled. In one or more embodiments, SWF onload is tracked. SWF onload tracks load time of each web page of the content of the RIA. This data can be used with navigation tree analytics data to identify the most frequently used portions of the RIA content and automatically decide the order in which modules should be loaded in order to optimize a user's experience. In one or more embodiments, video tracking, state tracking and button tracking are enabled as described below.

Figure 10:
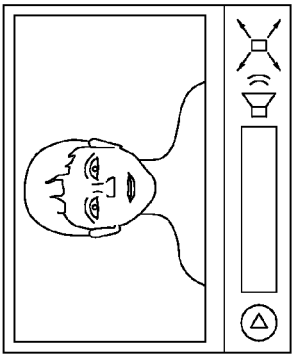
FIG. 10 illustrates a display screen containing a display for video event tracking, according to one or more embodiments of the invention.

FIG. 10 illustrates a display screen of the user interface 900 from FIG. 9 containing a display for video event tracking, according to one or more embodiments. When video tracking is selected in the selection pane 1004, a video tracking pane 1006 is displayed. From the video tracking pane, 1006, various analytics pertaining to video may be selected for tracking. For example, in one or more embodiments, a video event may be load time, "play" button clicks, "stop" button clicks, "pause" button clicks, percent of video viewed, and the like. The data types associated with these events may, in one embodiment, be timestamps. This information can be used to generate analytics regarding how long a video is played, whether the user is doing other things while the video is playing, etc. Video tracking analytics are used to determine the impact of the video as a marketing tool. For example, the length of time an end user views a video of, for instance, a fashion show, can be viewed in relation to the clothing sales of those fashions displayed in the video. A long load time on a video or a showing that a user navigates away from the RIA during the playing of a video can be used to evaluate the impact of the video. When the selections are complete, the video tracking preferences are saved and the video tracking pane 1006 is closed.

FIG. 11 illustrates a display screen of the user interface 900 from FIG. 9 containing a display for state tracking, according to one or more embodiments. When state tracking is selected, a state tracking selection pane 1104 is displayed. State tracking monitors deep links to web pages within the RIA. Deep linking allows end users to navigate to a specific location in the RIA without first visiting the home page. For example, if an end user is visiting a social networking site and clicks on an advertisement that directs the end user from that social networking site to a video on the RIA, state tracking can report that the end user navigated directly to that video, rather than traversing the RIA through the home page. The state tracking selection allows the tracking of web pages, videos, images and the like. In one or more embodiments, pages are selected for state tracking using the page name. Alternatively, in one or more embodiments, pages are selected for state tracking using the SWF address. When selections are complete, the state tracking preferences are saved and the state tracking selection pane 1104 is closed.

Figure 12:
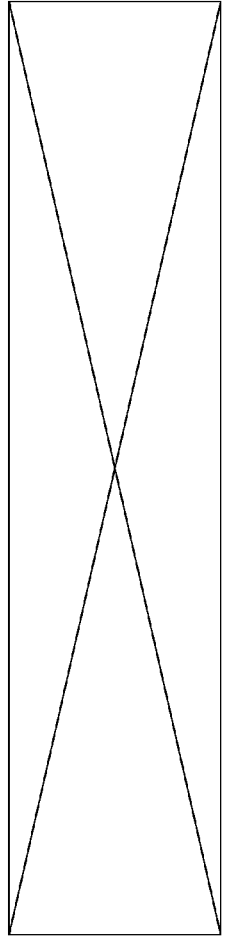
FIG. 12 illustrates a display screen containing a display for tracking one or more buttons contained in the rich Internet application, according to one or more embodiments of the invention.

FIG. 12 illustrates a display screen of the user interface 900 from FIG. 900 containing a display for tracking one or more buttons, according to one or more embodiments. When button tracking is selected, a button selection pane 1204 is displayed. Button tracking monitors what buttons in the RIA are used by an end user. The data from button tracking can show what buttons are most often used, which can be linked to the button placement, prominence, etc. The pane contains all of the buttons in the rich Internet application 120. In one or more embodiments, when a button is selected, an additional tracking information pane 1206 may be displayed to track additional information with regard to the button. Monitoring on what page a button is clicked and the login information of the end user can be used for future marketing strategy. For example, if a "Checkout" button is clicked from a "Men's Fashions" page and the login information of the end user indicates that a female is making the purchase, marketing strategies can be implemented on the "Men's Fashion" page that appeal to women.

FIG. 13 depicts a diagram of a navigation tree 1300 as created by the navigation tree generator 138 of FIG. 1, according to one or more embodiments of the invention. The navigation tree 1300 is designed to provide a visual representation of user navigation through the rich Internet application. Each web page visited by the end user is represented as a node 1302. User navigation through the RIA is recorded and sent to the analytics server. The navigation tree generator creates a hierarchy, based on the user navigation information. In one embodiment, all user interactions are recorded and sent to the analytics server and the navigation tree 1300 is constructed for a single end user session. In another embodiment, only selected paths in the user interactions will be recorded and the navigation tree 1300 will be created based on the aggregation of all user interactions for the selected paths. The navigation tree 1300 is a display of the most commonly used path by users. Each web page of the RIA is represented as a node 1302 in the navigation tree 1300. The paths 1304 between nodes 1302 show the path the user has taken to arrive at the webpage, specifically, what page the end user was visiting when the end user clicked the link that brought the user to the next webpage. More frequently traversed paths 1304, from one node 1302 to another, are displayed bolder than lesser traversed paths 1304. The most frequently visited nodes 1302 are circled. For example, an end user may be shopping on the "Women's Fashion" page and adding items to her "Shopping cart". The end user may iterate looking at the "Shopping cart" page and return to the "Women's Fashion" page to continue shopping. The end user may also visit the "Men's Fashion" page once or twice. The nodes 1302 for the website's Home page, Women's Fashion page, the Men's Fashion page, the Shopping cart page are displayed in the navigation tree 1300 with the path 1304 between the Women's Fashion node 1302 and Shopping cart node 1302 displayed in boldface. The path 1304 between the Shopping cart node 1302 and the Men's Fashion node 1302 is displayed in normal typeface. Additionally, the Women's Fashion node 1302 and the Shopping cart node 1302 are circled to show they were the most visited webpages in the RIA.

FIG. 14 illustrates a screen display 1400 of a clickmap as created by the clickmap generator 140 of FIG. 1, according to one or more embodiments. The clickmap generator uses the analytics data generated from the end user activity to aggregate all user click activity for all buttons and/or links in the content of the RIA selected for tracking and calculates what percentage of total clicks are associated with each button and/or link. The display 1400 comprises the content 1404 of the rich Internet application. The content is displayed as it is seen by the end user. For each event element 1404, the click traffic percentage 1406 is overlaid on the event elements 1404 in the display 1400. In the display 1400, the buttons "Men", "Women", "Shop", and "Sign In" were selected for tracking. Information regarding user clicks on these buttons was gathered as users navigated through the RIA, the analytics generation module 136 of FIG. 1 generated the analytics data based on the user information and the clickmap generator calculated and displayed the percentages of click traffic that are overlaid on the content for "Men", "Women", "Shop", and "Sign In".

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a non-transient computer-usable or computer-readable storage medium having computer-usable or computer-readable program code embodied in the medium for use by or in connection with an instruction execution system. In the context of this document, a computer-usable or computer-readable medium may be any non-transient medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 15:
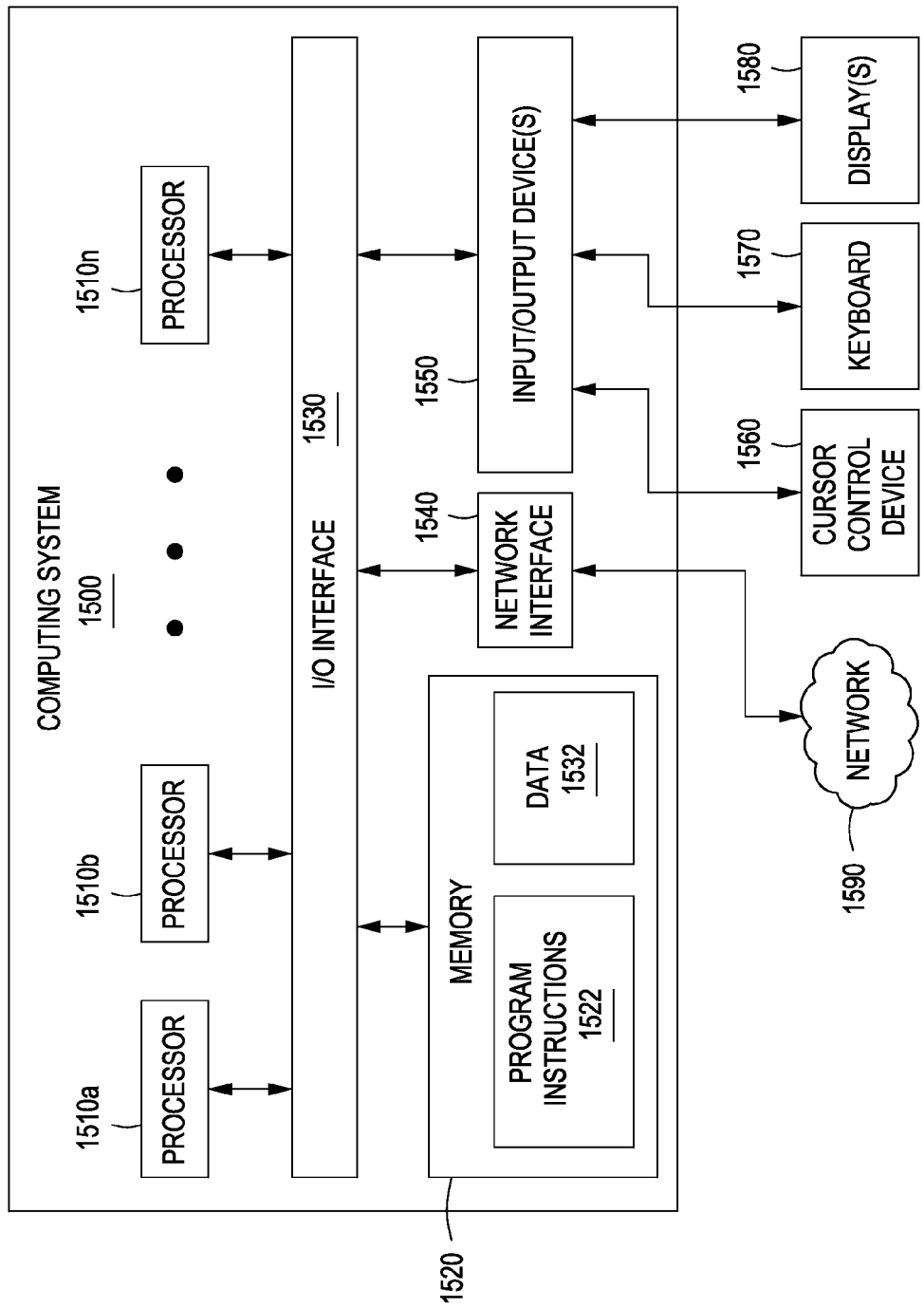
FIG. 15 is a block diagram of a computer system used to implement one or more embodiments.

FIG. 15 depicts a computer system that can be utilized in various embodiments of the present invention, according to one or more embodiments.

Various embodiments of a method and apparatus for isolating analytics logic from content creation in a rich Internet application, as described herein, may be executed on one or more computer systems, which may interact with various other devices. One such computer system is computer system 1500 illustrated by FIG. 15, which may in various embodiments implement any of the elements or functionality illustrated in FIGS. 1-16. In various embodiments, computer system 1500 may be configured to implement methods described above. While the illustrated system demonstrates computer system 1500 implementing method 200, computer system 1500 may be used to implement any other system, device, element, functionality or method of the above-described embodiments. In the illustrated embodiments, computer system 1500 may be configured to implement methods 200, 300, 400, 500, 600 and 700 as processor-executable executable program instructions 1522 (e.g., program instructions executable by processor(s) 1510) in various embodiments.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In various embodiments, any of components may be utilized by the system to receive user input described above. In various embodiments, a user interface (e.g., user interface) may be generated and displayed on display 1580. In some cases, it is contemplated that embodiments may be implemented using a single instance of computer system 1500, while in other embodiments multiple such systems, or multiple nodes making up computer system 1500, may be configured to host different portions or instances of various embodiments. For example, in one embodiment some elements may be implemented via one or more nodes of computer system 1500 that are distinct from those nodes implementing other elements. In another example, multiple nodes may implement computer system 1500 in a distributed manner.

In different embodiments, computer system 1500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x96, PowerPC, SPARC, or MIPS ISAs, or any other suitable ISA. In multiprocessor systems, each of processors 1510 may commonly, but not necessarily, implement the same ISA.

System memory 1520 may be configured to store program instructions 1522 and/or data 1532 accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1520. In other embodiments, program instructions and/or data may be received, sent or stored upon different types of non-transient computer-readable media or on similar media separate from system memory 1520 or computer system 1500.

In one embodiment, I/O interface 1530 may be configured to coordinate I/O traffic between processor 1510, system memory 1520, and any peripheral devices in the device, including network interface 1540 or other peripheral interfaces, such as input/output devices 1550, In some embodiments, I/O interface 1530 may perform any necessary protocol, timing or other data transformations to convert data signals from one components (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network (e.g., network 1590), such as one or more external systems or between nodes of computer system 1500. In various embodiments, network 1590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

In some embodiments, the illustrated computer system may implement any of the methods described above, such as the methods illustrated by the flowcharts of FIGS. 2-7. In other embodiments, different elements and data may be included.

Those skilled in the art will appreciate that computer system 1500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The present invention offers various advantages by isolating analytics logic from content creation in a rich Internet application. Marketers no longer need to work with developers to have tracking code embedded in the RIA at content creation. It provides the marketer with an intuitive interface for selecting event elements for tracking and modifying those selections without needing to work with the RIA content creator. The present embodiments prevent costs and time associated with project planning, approvals, development, testing, acceptance and deployment.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for isolating analytics tracking logic from content creation for a rich Internet application comprising:
 receiving, from a web server, a swf file including rich Internet content, the swf file comprising a plurality of event elements with user interactive functionality;
 receiving a selection of one or more event elements from the plurality of event elements within the swf file for subsequent analytics tracking of user interactions with the one or more selected event elements within the swf file;
 generating a separate XML, file that includes tags for the selected one or more event elements, wherein the tags in the separate XML file, when executed, indicate event elements in the swf file to analytically track, and wherein the separate XML file is created in isolation and separate from creation of the rich Internet content and the swf file;
 providing the separate XML file to the web server such that upon receiving a request for the swf file, the web server can provide the separate XML file with the swf file;
 receiving an updated selection of an event element from the plurality of event elements within the swf file selected for subsequent analytics tracking; and
 updating the separate XML file to include one or more updated tags for the updated selection of the event element, wherein updating the separate XML file is performed without replacing, recoding, or recompiling the swf file.

2. The method of claim 1, further comprising, upon receiving the selection of the one or more event elements of the swf file, collecting information regarding the selection.

3. The method of claim 2, further comprising: generating analytics data based on the selection; and providing the analytics data for display.

4. The method of claim 1, further comprising:
 automatically searching for and identifying the plurality of event elements; and
 initiating display of a list of the identified plurality of event elements.

5. The method of claim 1, wherein the rich Internet content comprises video and the tags in the separate XML file track a length of time an end user is viewing the video.

6. The method of claim 1, further comprising identifying an event type to be reported for each event produced by a respective event element.

7. The method of claim 1, further comprising identifying a data type to be reported for each event produced by a respective event element.

8. The method of claim 1, further comprising:
 receiving, from the web server, a second swf file comprising a second plurality of event elements;
 receiving a selection of one or more event elements of the second plurality of event elements of the second swf file for subsequent analytics tracking; and
 updating the separate XML file to include additional tags for the selected one or more event elements from the second plurality of event elements, wherein the additional tags in the separate XML file, when executed, indicate the one or more event elements from the second plurality of event elements in the second swf file to analytically track, and wherein the separate XML file is updated in isolation and separate from creation of the rich Internet content and the second swf file.

9. The method of claim 1, further comprising providing, to the web server, a navigation tree, wherein the navigation tree is a summary of tracked paths taken by a plurality of users navigating the rich Internet content.

10. The method of claim 1, further comprising providing analytics data for display as a clickmap.

11. A system comprising:
 at least one processor; and
 one or more non-transitory computer readable storage media having instructions stored thereon that, when executed by the at least one processor, cause the system to:
  receive, from a web server, a swf file including rich Internet content, the swf file comprising a plurality of event elements with user interactive functionality;
  receive a selection of one or more event elements from the plurality of event elements within the swf file for subsequent analytics tracking of user interactions with the one or more selected event elements within the swf file;
  generate a separate XML file that includes tags for the selected one or more event elements, wherein the tags in the separate XML, file, when executed, indicate event elements in the swf file to analytically track, and wherein the separate XML file is created in isolation and separate from creation of the rich Internet content and the swf file;
  provide the separate XML file to the web server such that upon receiving a request for the swf file, the web server can provide the separate XML file with the swf file;
  receive an updated selection of an event element from the plurality of event elements within the swf file selected for subsequent analytics tracking; and
  update the separate XML file to include one or more updated tags for the updated selection of the event element, wherein updating the separate XML file is performed without replacing, recoding, or recompiling the swf file.

12. The system of claim 11, further comprising instructions that, when executed by the at least one processor, cause the system to:
 activate the tags of the selected one or more event elements within the separate XML file and deactivate tags of deselected event elements from the updated selection within the separate XML file;

generate additional analytics data from analytics information received in response to navigation of the event elements; and provide the additional analytics data for display.

13. The system of claim 12, wherein the instructions that cause the system to provide the additional analytics data for display comprise instructions that, when executed by the at least one processor, cause the system to provide the additional analytics data for display as a navigation tree, wherein the navigation tree is a summary of tracked paths taken by a plurality of users navigating the rich Internet content.

14. The system of claim 13, wherein the instructions that cause the system to provide the additional analytics data for display comprise instructions that, when executed by the at least one processor, cause the system to:
indicate most common paths in the navigational tree; and
reorganize the separate XML file based on an order of most common paths such that selected event elements associated with the most common paths are loaded and executed before selected event elements not associated with the most common paths.

15. A non-transitory computer readable medium storing instructions for isolating analytics tracking logic from content creation that, when executed by at least one processor, causes a computer system to:
receive, from a web server, a swf file including rich Internet content, the swf file comprising a plurality of event elements with user interactive functionality;
receive a selection of one or more event elements from the plurality of event elements within the swf file for subsequent analytics tracking of user interactions with the one or more selected event elements within the swf file;
generate a separate XML file that includes tags for the selected one or more event elements, wherein the tags in the separate XML file, when executed, indicate event elements in the swf file to analytically track, and wherein the separate XML file is created in isolation and separate from creation of the rich Internet content and the swf file;
provide the separate XML file to the web server such that upon receiving a request for the swf file, the web server can provide the separate XML file with the swf file;
receive an updated selection of an event element from the plurality of event elements within the swf file selected for subsequent analytics tracking; and
update the separate XML file to include one or more updated tags for the updated selection of the event element, wherein updating the separate XML file is performed without replacing, recoding, or recompiling the swf file.

16. The non-transitory computer readable medium of claim 15, further comprising instructions that, when executed by the at least one processor, cause the computer system to highlight the selected one or more events elements in a first graphical user interface separate from a second graphical user interface displaying the swf file.

17. The non-transitory computer readable medium of claim 15, further comprising instructions that, when executed by the at least one processor, cause the computer system to:
generate analytics data based on the selection of the one or more event elements; and
provide the analytics data for display.

18. The non-transitory computer readable medium of claim 15, wherein a user provides the selection of the one or more event elements from the plurality of event elements within the swf file, wherein the user selection selects the one or more event elements from separate pages of the swf file.

19. The non-transitory computer readable medium of claim 15, further comprising instructions that, when executed by the at least one processor, cause the computer system to:
provide, to the web server, a navigation tree, wherein the navigation tree is a summary of tracked paths taken by a plurality of users navigating the rich Internet content.

20. The non-transitory computer readable medium of claim 19, further comprising instructions that, when executed by the at least one processor, cause the computer system to activate the tags of the selected one or more event elements within the separate XML file and deactivate tags of deselected event elements from the updated selection within the separate XML file.

* * * * *